(12) United States Patent
Karandikar et al.

(10) Patent No.: US 10,427,645 B2
(45) Date of Patent: Oct. 1, 2019

(54) MULTI-SENSOR PRECIPITATION-CLASSIFICATION APPARATUS AND METHOD

(71) Applicant: Ford Global Technologies, LLC, Dearborn, MI (US)

(72) Inventors: Ramchandra Ganesh Karandikar, Sunnyvale, CA (US); Nikhil Nagraj Rao, Union City, CA (US); Scott Vincent Myers, Camarillo, CA (US); Francois Charette, Tracy, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 121 days.

(21) Appl. No.: 15/287,305

(22) Filed: Oct. 6, 2016

(65) Prior Publication Data

US 2018/0099646 A1    Apr. 12, 2018

(51) Int. Cl.
*B60S 1/08* (2006.01)
*G06N 3/04* (2006.01)
(Continued)

(52) U.S. Cl.
CPC ........... *B60S 1/0844* (2013.01); *B60S 1/0859* (2013.01); *B60W 30/18172* (2013.01);
(Continued)

(58) Field of Classification Search
CPC ..... B60R 2300/8093; B60R 2011/0026; B60R 2001/1284; B60R 2011/0082;
(Continued)

(56) References Cited

U.S. PATENT DOCUMENTS

| 3,446,069 A | * | 5/1969 | Zink | ....................... G01W 1/14 |
| | | | | 340/602 |
| 4,527,105 A | * | 7/1985 | Shiraishi | ............... B60S 1/0822 |
| | | | | 15/DIG. 15 |

(Continued)

FOREIGN PATENT DOCUMENTS

| CN | 103434487 | 12/2013 |
| DE | 8914426 | 3/1990 |

(Continued)

OTHER PUBLICATIONS

Detection of Raindrops on a Windshield From an In-Vehicle Video Camera, International Journal of Innovative Computing, Information and Control, vol. 3, No. 6(B), December.

(Continued)

*Primary Examiner* — Courtney D Heinle
*Assistant Examiner* — Luis A Martinez Borrero
(74) *Attorney, Agent, or Firm* — David R. Stevens; Stevens Law Group (57) ABSTRACT

A vehicle is disclosed that uses data from different types of on-board sensors to determine whether meteorological precipitation is failing near the vehicle. The vehicle may include an on-board camera capturing image data and an on-board accelerometer capturing accelerometer data. The image data may characterize an area in front of or behind the vehicle. The accelerometer data may characterize vibrations of a windshield of the vehicle. An artificial neural network may run on computer hardware carried on-board the vehicle. The artificial neural network may be trained to classify meteorological precipitation in an environment of the vehicle using the image data and the accelerometer data as inputs. The classifications of the artificial neural network may be used to control one or more functions of the vehicle (Continued)

such as windshield-wiper speed, traction-control settings, or the like.

20 Claims, 7 Drawing Sheets

(51) Int. Cl.
*B60W 30/18* (2012.01)
*B60W 40/068* (2012.01)
*G06N 3/08* (2006.01)

(52) U.S. Cl.
CPC ......... *B60W 40/068* (2013.01); *G06N 3/0454* (2013.01); *G06N 3/08* (2013.01); *G06N 3/084* (2013.01)

(58) Field of Classification Search
CPC ........ B60R 2300/806; B60W 2420/10; B60W 40/10; B60S 1/0844; B60S 1/0859; B60S 1/0818; B60S 1/0837; B60S 1/0405
USPC .................. 701/36, 70, 117, 44, 74
See application file for complete search history.

(56) References Cited

U.S. PATENT DOCUMENTS

| | | | | |
|---|---|---|---|---|
| 4,833,373 A * | 5/1989 | Doi | ............... | B60R 1/0602 15/250.001 |
| RE33,848 E * | 3/1992 | Shiraishi | ............... | B60S 1/0822 15/250.001 |
| 5,119,002 A | 6/1992 | Kato | | |
| 6,392,218 B1 * | 5/2002 | Kuehnle | ............... | B60S 1/0822 250/208.1 |
| 6,892,580 B2 | 5/2005 | Pankey | ............... | B60S 1/0818 318/443 |
| 6,936,985 B2 * | 8/2005 | Pankey | ............... | B60S 1/0818 15/250.02 |
| 7,646,889 B2 | 1/2010 | Tsukamoto | | |
| 8,797,417 B2 | 8/2014 | Gayko | | |
| 9,045,112 B2 * | 6/2015 | Kracker | ............... | G06K 9/00791 |
| 9,702,818 B2 * | 7/2017 | Krokel | ............... | B60S 1/0844 |
| 2005/0016275 A1* | 1/2005 | Pankey | ............... | B60S 1/0818 73/579 |
| 2006/0221342 A1* | 10/2006 | Saikalis | ............... | B60S 1/0822 356/445 |
| 2006/0244581 A1* | 11/2006 | Breed | ............... | B60C 23/0408 340/447 |
| 2007/0016354 A1* | 1/2007 | Engel | ............... | B60T 8/172 701/80 |
| 2007/0267993 A1* | 11/2007 | Leleve | ............... | B60S 1/0822 318/483 |
| 2009/0093927 A1* | 4/2009 | Mueller-Schneiders | ............... | B60R 16/0232 701/36 |
| 2010/0208060 A1* | 8/2010 | Kobayashi | ............... | B60S 1/0844 348/135 |
| 2010/0211270 A1* | 8/2010 | Chin | ............... | B60W 40/09 701/44 |
| 2011/0031921 A1* | 2/2011 | Han | ............... | B60S 1/0837 318/483 |
| 2011/0128543 A1* | 6/2011 | Choi | ............... | B60S 1/0833 356/342 |
| 2013/0044910 A1* | 2/2013 | Cord | ............... | G06T 7/0002 382/100 |
| 2013/0235381 A1* | 9/2013 | Kroekel | ............... | B60S 1/0844 356/445 |
| 2013/0332028 A1* | 12/2013 | Heger | ............... | B60Q 1/085 701/36 |
| 2014/0321709 A1* | 10/2014 | Kasahara | ............... | B60S 1/0844 382/103 |
| 2014/0347487 A1* | 11/2014 | Ahiad | ............... | G06K 9/00798 348/148 |
| 2015/0015711 A1* | 1/2015 | Ahiad | ............... | B60S 1/0844 348/148 |
| 2015/0034827 A1* | 2/2015 | Krokel | ............... | B60S 1/0844 250/341.8 |
| 2015/0203107 A1* | 7/2015 | Lippman | ............... | B60W 30/00 701/23 |
| 2015/0321644 A1* | 11/2015 | Kosubek | ............... | B60S 1/0844 348/148 |
| 2015/0332099 A1* | 11/2015 | Kosubek | ............... | B60S 1/0844 348/148 |
| 2017/0083775 A1* | 3/2017 | Grauer | ............... | G06K 9/00798 |
| 2017/0101095 A1* | 4/2017 | Nilsson | ............... | B60W 30/146 |
| 2017/0253201 A1* | 9/2017 | Maeshiro | ............... | B60S 1/023 |
| 2018/0017799 A1* | 1/2018 | Ahmad | ............... | H04N 9/3194 |
| 2018/0072381 A1* | 3/2018 | Guida | ............... | B62J 11/00 |

FOREIGN PATENT DOCUMENTS

| | | |
|---|---|---|
| JP | 59137857 | 8/1984 |
| KR | 20120064474 A | 6/2012 |
| WO | WO-2014032933 A1 | 3/2014 |
| WO | WO-2015165448 A1 | 11/2015 |

OTHER PUBLICATIONS

Environment Recognition Technologies for Supporting Safe Driving, Hitachi Review vol. 53 (2004), No. 4.

* cited by examiner

MULTI-SENSOR PRECIPITATION-CLASSIFICATION APPARATUS AND METHOD

BACKGROUND

Field of the Invention

This invention relates to vehicular systems and more particularly to systems and methods for developing, training, and applying algorithms for classifying meteorological precipitation or certain effects thereof in a driving environment.

Background of the Invention

Rain and other meteorological precipitation can affect the functionality of vehicles. For example, rain can lower traction, enhance glare, impair vision, or the like. Accordingly, what is needed is a vehicular system and method for detecting and responding to rain and other meteorological precipitation.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
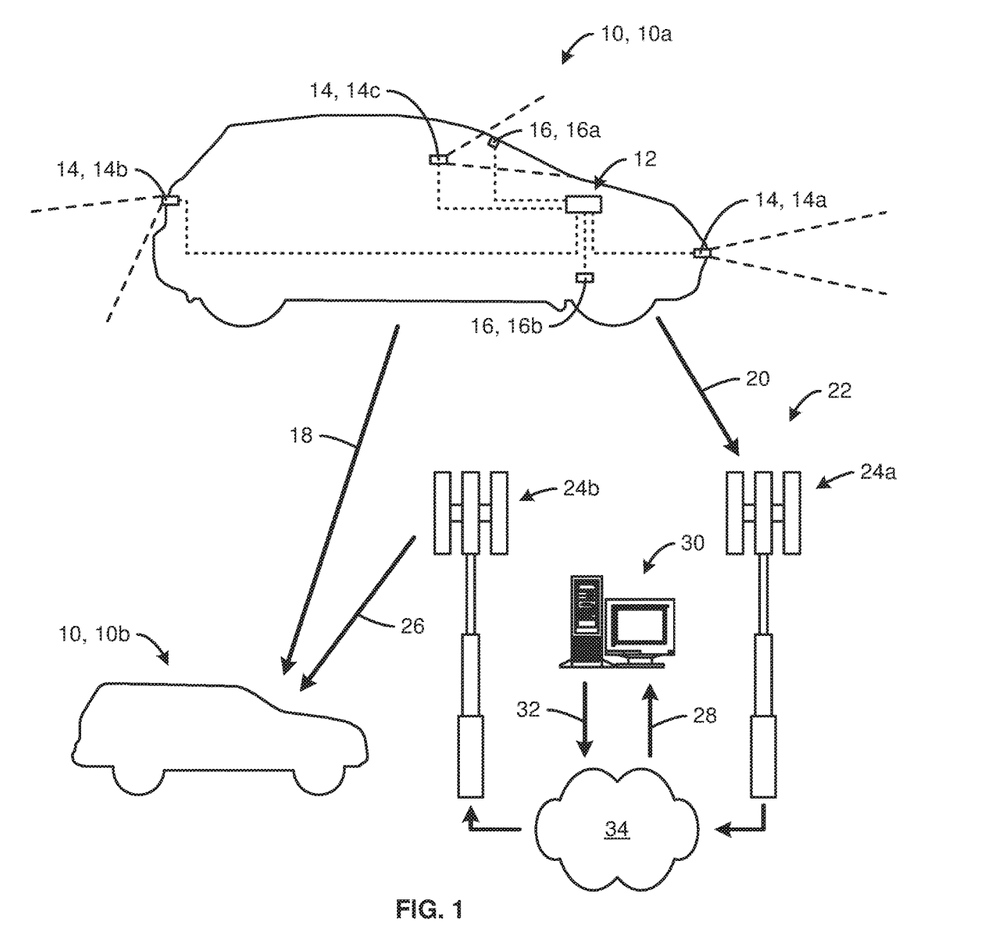
FIG. 1 is a schematic diagram illustrating one embodiment of a system in accordance with the present invention carried on-board a vehicle.

Referring to FIG. 1, the real world presents an array of conditions and obstacles that are ever changing. This reality creates significant challenges for vehicle-based systems providing autonomous control of certain vehicle functions or dynamics and/or autonomous driving. To overcome these challenges, a vehicle 10 may be equipped with sensors that enable systems thereof to sense (and, therefore, appropriately respond to) a surrounding environment and/or the effects the surrounding environment on the vehicle 10. Moreover, a vehicle 10 may be equipped with a diverse set of sensors so that the weakness or "blind spots" of one sensor may be covered or ameliorated by one or more other sensors.

For example, a system 12 in accordance with the present invention may include one or more image sensors 14. The output of such sensors 14 may be very useful in classifying meteorological precipitation in an area surrounding or near a vehicle 10. However, the one or more image sensors 14 of the system 12 may not characterize all aspects of meteorological precipitation. Accordingly, the system 12 may include one or more other sensors 16 that characterize other aspects of meteorological precipitation. By using the data from multiple types of sensors 14, 16, a system 12 in accordance with the present invention may be more robust and accurate in its classifications of meteorological precipitation.

In selected embodiments, a system 12 may analyze image data collected or captured by one or more image sensors 14 carried on-board a vehicle 10. Such image sensors 14 may include one or more cameras, Lidar devices, radar devices, sonic imaging devices, or the like or combinations or sub-combinations thereof. One or more image sensors 14 may be forward facing image sensors 14a, rearward facing image sensors 14b (e.g., one or more back-up cameras), in-cabin image sensors 14c (e.g., one or more cameras capturing an interior or driver's point of view of and/or through a windshield), or the like or a combination or sub-combination thereof.

In certain embodiments, Lidar, camera, radar, sound, and prior high definitions maps or the like output by one or more image sensors 14 (e.g., one or more forward facing image sensors 14a) may be fused to allow prediction of precipitation intensity or rate as well as when a corresponding storm front may reach a vehicle 10. This may enable a feed-forward system that would not have to wait until a driver's vision is impaired to turn on one or more wipers. It may also provide a better estimation of desired wiper speed. Alternatively, or in addition thereto, predictions of when a corresponding storm front may reach a vehicle 10 may be used to provide warnings to a corresponding driver and, for autonomous vehicles, an impetus for changing a path of travel in favor of one or more potentially safer routes.

Image data (e.g., video) captured by one or more image sensors 14 may be processed by a system 12 as individual images or frames. For example, an artificial neural network within a system 12 may be fed images or frames captured by one or more image sensors 14. Accordingly, the artificial neural network may take such images or frames into consideration as it determines which class (e.g., which precipitation condition of a closed set of precipitation conditions) is represented therein.

In selected embodiments, an artificial neural network corresponding to a system 12 in accordance with the present invention may analyze multiple consecutive images captured by an image sensor 14 over a short period of time (e.g., several images captured over a period of a few seconds). If a significant majority of the images are indicative as a first precipitation condition (e.g., rain falling at or near a particular precipitation rate), a system 12 may, depending on the analysis of data corresponding to one or more other sensors 16, be more likely to determine that the first precipitation condition is present in the environment of the vehicle 10.

Other sensors 16 included within a system 12 in accordance with the present invention may include one or more accelerometers (e.g., one or more accelerometers 16a positioned to monitor and characterize vibrations of a windshield of a vehicle 10, which vibrations may be indicative of the type and/or amount of meteorological precipitation that is impacting the vehicle 10), one or more drivetrain sensors (e.g., one or more sensors 16b positioned to monitor or characterize wheel slippage, frictional engagement between one or more tires a driving surface, or the like), one or more temperature sensors (e.g., one or more thermometers measuring outside temperature, which may be indicative of the type of meteorological precipitation that is impacting the vehicle 10), one or more pressure sensors (e.g., one or more pressure sensors on a windshield, window, or other structure of a vehicle 10 to monitor or characterize wind speed, which may be used to provide better handling of vehicles 10 that are autonomous), a speedometer, or the like or a combination or sub-combination thereof. Accordingly, an artificial neural network may receive as an input the signal or data derived from one or more such sensors 16. Thus, the classifications made by an artificial neural network may be more robust and accurate for being based on data collected by or corresponding to one or more image sensors 14 and one or more non-image sensors 16.

In certain embodiments, the classifications performed by an artificial neural network may occur in real time with the capturing of the sensor data upon which the classification is based. That is, an artificial neural network may quantify the correspondence of particular sensor data (e.g., image data, accelerometer data, wheel-slippage or friction data, temperature data, wind-speed data, vehicle-speed data, or the like or a combination or sub-combination thereof) to one or more classes within a very short period of time after the capture of that particular sensor data by the various sensors 14, 16 forming part of a system 12. In selected embodiments, that very short period of time may be about 10 seconds or less.

In selected embodiments, classifications or information characterizing classifications may be passed or communicated from a system 12 on-board a vehicle 10 to some hardware located off-board the vehicle 10. That is, classification information may be passed vehicle-to-vehicle (V2V), vehicle-to-infrastructure (V2I), vehicle-to-everything (V2X), or the like or a combination or sub-combination thereof. For example, classification information generated by a system 12 on-board one vehicle 10a may be passed to one or more other vehicles 10b that are nearby. Accordingly, classifications made on one vehicle 10a may be used (e.g., wholly adopted or taken into consideration) by systems 12 on-board one or more other vehicles 10b.

In selected embodiments, classification information may be passed 18 directly from one vehicle 10a to another vehicle 10b (e.g., via a radio transmission). Alternatively, classification information may be fed 20 by a system 12 on-board a vehicle 10a into a communication system 22 (e.g., a communication system 22 comprising stationary telecommunication infrastructure). For example, a system 12 may feed 20 classification information into a cellular telephone network by sending one or more signals to a nearby cellular tower 24a. In selected embodiments, classification information fed 20 in by a system 12 may be routed through a communication system 22 and delivered 26 to corresponding systems 12 of one or more other vehicles 10b. Alternatively, classification information fed 20 into a communication system 22 by a system 12 may be delivered 28 to a computer system 30, processed by the computer system 30, fed 32 by the computer system 30 back into the communications system 22, and delivered 26 to corresponding systems 12 of one or more other vehicles 10b.

For example, in selected embodiments, a communication system 18 may include a cellular telephone network comprising a first cellular tower 24a located near a first vehicle 10a, a second cellular tower 24b located near a second vehicle 10b, and a network 34 connecting the first cellular tower 24a to the second cellular tower 24b. A computer system 30 may also connect to the network 34. Accordingly, classification information fed 20 into the cellular telephone network by a system 12 corresponding to the first vehicle 10a may be received by the computer system 30 so that it can be recorded, processed, distributed to one or more other vehicles 10b, or the like or a combination or sub-combination thereof.

In selected embodiments, the classification performed by a system 12 in accordance with the present invention may be agnostic to any particular feature contained within the one or more images captured by any image sensor 14 or sensor data captured by one or more other sensors 16. That is, an artificial neural network within a system 12 may not search data corresponding to the various sensors 14, 16 for any particular feature. Rather, an artificial neural network may judge whether all the sensor data received thereby taken as a whole is more indicative of one class or another.

This agnosticism of a system 12 in accordance with the present invention may provide significant advantages. For example, each image may be examined or analyzed "as is." That is, there may be no need for image pre-processing for a system 12 to function properly. Furthermore, no additional calibration may be needed. Moreover, an artificial neural network may use one or more images in its classification process without regard to whether an image sensor 14 that captured the one or more images was fixed in an exact location, pointed more toward the sky, pointed more toward the road, pointed forward, pointed reward, or the like.

Figure 2:
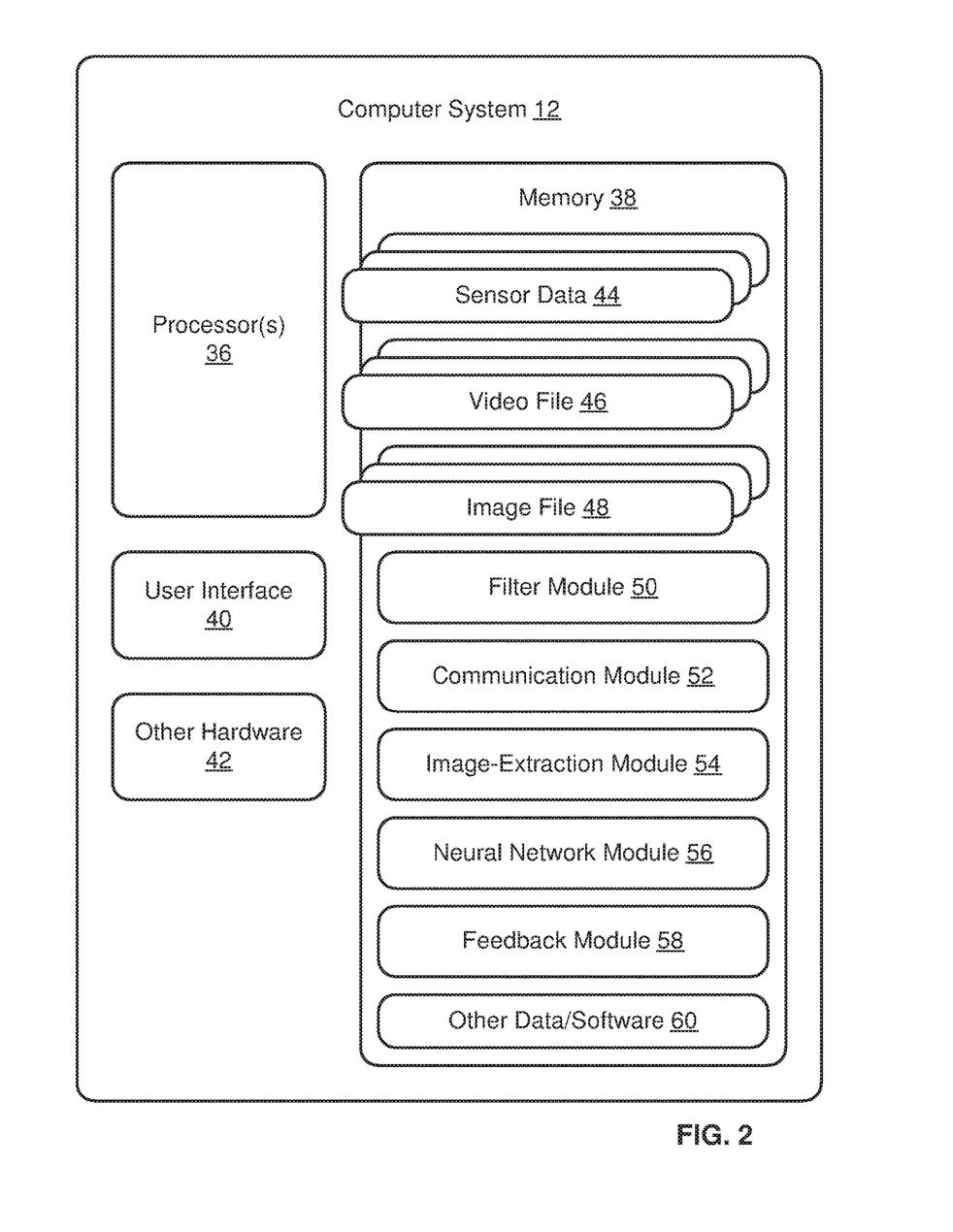
FIG. 2 is a schematic block diagram illustrating one embodiment of a system in accordance with the present invention.

Referring to FIG. 2, a system 12 in accordance with the present invention may be, include, or support classification of meteorological precipitation using deep learning. A system 12 may accomplish this in any suitable manner. For example, a system 12 may be embodied as hardware, software, or some combination thereof.

In selected embodiments, a system 12 may include computer hardware and computer software. The computer hardware of a system 12 may include one or more processors 36, memory 38, one or more user interfaces 40, other hardware 42, or the like or a combination or sub-combination thereof. In certain embodiments, all or some subset of this computer hardware may be hardware already included as part of a vehicle 10. That is, all or some portion of the computer hardware may be multipurpose and perform tasks that are already associated with the operation of the vehicle 10.

The memory 38 of a system 12 in accordance with the present invention may be operably connected to the one or more processors 36 and store the computer software. This may enable the one or more processors 36 to execute the computer software. Thus, a system 12 may augment the functionality or features of a vehicle 10 by adding and/or modifying software, adding additional hardware to the vehicle 10, or a combination thereof.

A user interface 40 of a system 12 may enable an engineer, technician, driver, or the like to interact with, run, customize, or control various aspects of a system 12. In selected embodiments, a user interface 40 of a system 12 may include one or more keypads, keyboards, touch screens, pointing devices, or the like or a combination or sub-combination thereof. Alternatively, or in addition thereto, a user interface 40 may comprise a port through which one or more external computers may communicate with a system 12 or one or more components thereof.

In selected embodiments, the memory 38 of a system 12 may store (at least temporality) sensor data 44 (e.g., one or more segments of signal output by one or more sensors 16 carried on-board a vehicle 10), video 46 (e.g., one or more video files 46) collected or captured by one or more image sensors 14 carried on-board a vehicle 10, one or more images files 48 containing, defining, or corresponding to one or more images captured by one or more image sensors 14 or extracted from video collected or captured by one or more image sensors 14, or the like or a combination or sub-combination thereof.

Additionally, the memory 38 may store one or more software modules. For example, the memory 38 may store a filter module 50, communication module 52, image-extraction module 54, neural network module 56, feedback module 58, other data or software 60, or the like or a combination or sub-combinations thereof. Alternatively, one or more of the filter module 50, communication module 52, image-extraction module 54, neural network module 56, and feedback module 58 may be embodied as hardware or comprise hardware components. Thus, while FIG. 2 shows the filter module 50, communication module 52, image-extraction module 54, neural network module 56, and feedback module 58 as being software-only modules that are stored in memory 38, in actuality, one or more of those modules 50, 53, 54, 56, 58 may comprise hardware, software, or a combination thereof.

A filter module 50 may enable a system 12 to filter signal output by one or more sensors 14, 16 as desired or necessary. For example, the signal output by an accelerometer 16a monitoring the vibration of a windshield may be noisy. Accordingly, filter module 50 may filter that signal to facilitate the extraction of useful data therefrom. In selected embodiments, a filter module 50 may apply a low pass filter the signal output by one or more accelerometers (e.g., one or more accelerometers 16a mounted on and/or monitoring the vibrations of a windshield) to locate and separate the variation in vibration caused by meteorological precipitation impacting the corresponding vehicle 10.

A communication module 52 may enable data such as one or more segments of sensor data 44, video files 46, image files 48, software components (e.g., one or more modules 50, 52, 554, 56, 58 or updates thereto), classifications (e.g., classification information output by the artificial neural network of a system 12), or the like or combinations of sub-combinations thereof to be passed (e.g., passed 18, 20, 26 via radio waves) into or out of a system 12 in accordance with the present invention. For example, a communication module 52 forming part of a system 12 carried on-board one vehicle 10b may enable that system 12 to receive classification information generated by another vehicle 10a. Alternatively, or in addition thereto, a communication module 52 may enable a system 12 to receive an update to its neural network module 56. Accordingly, improvements developed off-board a vehicle 10 may be brought on-board as desired or necessary.

An image-extraction module 54 may extract one or more images from video captured by one or more image sensors 14. For example, an image-extraction module 54 may extract one or more images (e.g., several images captured over a period of a few seconds or less) from a video file 46 that is stored in memory 38, video that is being output by an image sensor 14, or the like. In selected embodiments, an image-extraction module 54 may store one or more images that are extracted thereby as images files 48 in memory 38.

A neural network module 56 may be, include, or support an artificial neural network programmed to perform or apply deep learning. The deep learning performed or applied by an artificial neural network may use one or more algorithms to model high-level abstractions in data corresponding to one or more images, other sensor data, and/or combinations thereof that are collected by the various sensors 14, 16 of a system 12 in accordance with the present invention. In selected embodiments, this may be accomplished by using multiple processing layers comprising multiple non-linear transformations.

For example, an artificial neural network corresponding to a neural network module 56 may comprise feed-forward computational graphs with input nodes, hidden layers and output nodes. For classifications that involve images, pixel-values of an input image forming part of the classification may be assigned to input nodes, and then be fed through the network, passing a number of non-linear transformations. At the end of the computation, the output node may yield a value that corresponds to the class inferred by the neural network.

In order for an artificial neural network corresponding to a neural network module 56 to be able to distinguish between different classes of meteorological precipitation, it needs to be trained based on examples. Accordingly, to create an artificial neural network that is able to classify a plurality of different types and/or levels of meteorological precipitation, a large collection of example images and other sensor data (e.g., hundreds to thousands for each type and/or level) having known (e.g., labeled) precipitation conditions must be used as training data. Thus, using backpropagation, an artificial neural network may be trained.

Once trained, an artificial neural network corresponding to a neural network module 56 may receive one or more inputs (e.g., data output by or corresponding to one or more sensors 14, 16) and classify those inputs as having a particular numeric affinity (e.g., percentage "score") for each class for which the artificial neural network was trained. Accordingly, if an artificial neural network were trained on twenty different classes of meteorological precipitation, then for one or more inputs, the artificial neural network may output twenty numeric scores. Each such score may be indicative of the affinity of the one or more inputs (or of the physical reality reflected by the one or more inputs) to a different class of meteorological precipitation.

In a decisive or clear classification, the one or more inputs may show a strong affinity to one class of meteorological precipitation and weak affinity to all other classes of meteorological precipitation. In an indecisive or unclear classification, the one or more inputs may show no preferential affinity to any particular class of meteorological precipitation. For example, there may be a "top" score for a particular class, but that score may be close to other scores for other classes.

Accordingly, in selected embodiments, a neural network module 56 may apply one or more threshold comparisons or tests to determine whether any particular classification is sufficiently decisive or clear so as to be acted or relied upon (e.g., whether the classification is sufficiently decisive or clear so as to alter some function of a vehicle 10 to better prepare the vehicle 10 to address the effects of the predicted or perceived meteorological precipitation). For example, a neural network module 56 may test a classification to see if the separation between a top score and all other scores meets or satisfies a certain separation threshold.

In certain embodiments, an artificial neural network forming, supported by, or included within a neural network module 56 may operate on-board a vehicle 10 in a training mode or an implementation mode. In training mode, the artificial neutral network may train on multiple training images or sensor data corresponding to known classes of meteorological precipitation. In implementation mode, the artificial neural network may analyze image data captured by one or more image sensors 14 (e.g., a single image, multiple images, or multiple consecutive images extracted from video captured by a camera) and/or sensor data generated by or corresponding to one or more other sensors 16 in order to classify a corresponding environment surrounding a vehicle 10 as being in one precipitation condition or another for some period of time (e.g., until a subsequent image and/or sensor data is classified or over a period of about 1 second, 3 seconds, 5, seconds, 10 seconds, or the like).

Accordingly, an artificial neural network corresponding to a neural network module 56 may be trained while operating within or on the hardware of a system 12 carried on-board as part of the standard or optional equipment of a production vehicle 10. Alternatively, an artificial neural network corresponding to a neural network module 56 may be trained while operating within or on the hardware a non-production system 12 (e.g., an off-board system 12 in a computer laboratory, a non-production system 12 carried on-board a test vehicle 10 specifically for the purposes of training, or the like), then "cloned" or otherwise copied onto or imported within a production system 12 forming part of a production vehicle 10.

In certain embodiments, a neural network module 56 may be, include, or support a single, general purpose artificial neural network. That general purpose artificial neural network may receive all the available or desired inputs (e.g., all the data from both image sensors 14 and other non-image sensors 16) and output all the affinity scores for all the different classes of meteorological precipitation. However, in other embodiments, a neural network module 56 may comprise, include, or support multiple, job-specific artificial neural networks or one or more artificial neural networks that process fewer that all the available inputs. For example, in certain embodiments, a first, image-specific artificial neural network may classify image data corresponding to one or more image sensors 14, while one or more other processing systems or methods may be applied to accelerometer data and/or data from one or more other sensors 16. Thus, the work of analysis and classification performed by a neural network module 56 may be divided up among one or more multiple artificial neural networks, other processing or analysis systems, or combinations thereof.

In selected embodiments, a feedback module 58 may be included within a system 12 to support or enable on-board training of an artificial neural network corresponding to a neural network module 56. A feedback module 58 may provide information to a neural network module 56 that indicates which class or condition corresponds to which sensor data. Thus, a feedback module 58 may enable a system 12 to generate training data on which to train (or improve the training of) a corresponding artificial neural network.

That is, in order to train an artificial neural network, training data of a known class may be analyzed by the artificial neural network. It may not be enough for a system 12 to have sensor data collected by one or more on-board sensors 14, 16. The system 12 may also need to know which of that sensor data corresponds to one class and which corresponds to another. This additional information may be collected and provided by a feedback module 58.

For example, a feedback module 58 may note when a human driver turns on the windshield wipers, as this may indicate a rain condition. Accordingly, sensor data collected or captured at or near a time when the windshield wipers were turned on by a driver may be "known" to correspond to a rain condition. Similarly, a feedback module 58 may note when a human driver activates a jet of windshield washer fluid, as this may indicate a road spray condition. Accordingly, sensor data collected or captured at or near a time when the jet of windshield washer fluid was turned on by a driver may be "known" to correspond to a road spray condition.

In selected embodiments, multiple functions or facts may be monitored by a feedback module 58 in order to gather information indicative of a current condition. For example, rather than just noting when a driver turns on the windshield wipers, a feedback module 58 may note when the driver turns on the windshield wipers without also activating the jets of windshield washer fluid. The latter may be more closely associated with rain in the environment surrounding a vehicle 10 than the former.

Other data and/or software 60 corresponding to a system 12 may support the operation of that system 12 as desired or necessary. In certain embodiments, other software 60 may include a control module programmed to request, initiate, or implement one or more actions or functions based on the classifications determined by a neural network module 56. For example, when a neural network module 56 determines based on certain sensor data that it is raining at a particular precipitation rate, a control module may request, initiate, or implement changes such as activating certain wiper blades or lights, changing (e.g., increasing or decreasing) a speed on certain wiper blades, changing certain traction control settings, or otherwise preparing a corresponding vehicle 10 to deal with issues associated with that particular rain condition.

Figure 3:
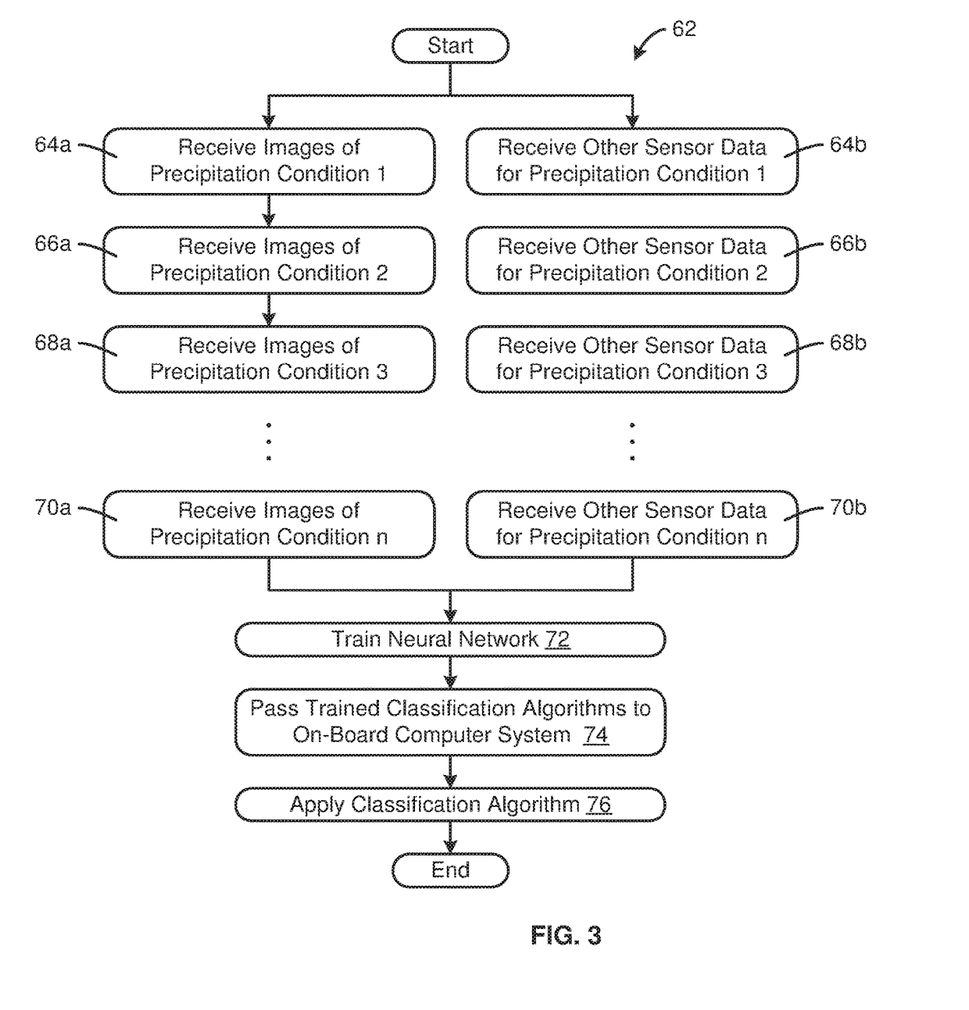
FIG. 3 is a schematic block diagram of one embodiment of a training method in accordance with the present invention.

Referring to FIG. 3, an off-board system 12 in a computer laboratory, a non-production system 12 carried on-board a test vehicle 10 specifically for the purposes of training, or the like may support, enable, or execute a training process 62 in accordance with the present invention. In selected embodiments, such a process 62 may begin with receiving 64a, 64b image data (e.g., images or the like that are, match, or model what would be collected by or correspond to one or more image sensors 14) and other sensor data (e.g., accelerometer data, wheel-slippage or friction data, temperature data, wind-speed data, vehicle-speed data, or the like or a combination or sub-combination thereof that is, matches, or models what would be collected by or correspond to one or more other sensors 16) known to correspond to a first precipitation condition. This may be repeated for various other precipitation conditions of interest. Thus, the process 62 may continue with receiving 66a, 66b image data and other sensor data known to correspond to a second precipitation condition, receiving 68a, 68b image data and other sensor data known to correspond to a third precipitation condition, and so forth until image and sensor data known to correspond to an "Nth" (i.e., final) precipitation condition is received 70a, 70b.

Each different precipitation condition may correspond to or be a different class of meteorological precipitation. Thus, a process 62 may comprise receiving image and other sensor data corresponding to each class of meteorological precipitation that is to be classified. An artificial neural network (e.g., a single, general purpose artificial neural network or one or more data-specific neural networks) may then train 72 on the received image and/or second data.

One or more trained artificial neural networks (e.g., one or more artificial neural networks comprising a set of classification algorithms that have proven effective in classifying meteorological precipitation based on image and/or other sensor data) may then be passed 74 to (e.g., stored on) an on-board computer system 12 of a vehicle 10. The trained artificial neural network or networks may then apply 76 classification algorithms corresponding thereto to image and/or other sensor data collected or captured by one or more image and/or other sensors 14, 16 carried on-board that vehicle 10.

Figure 4:
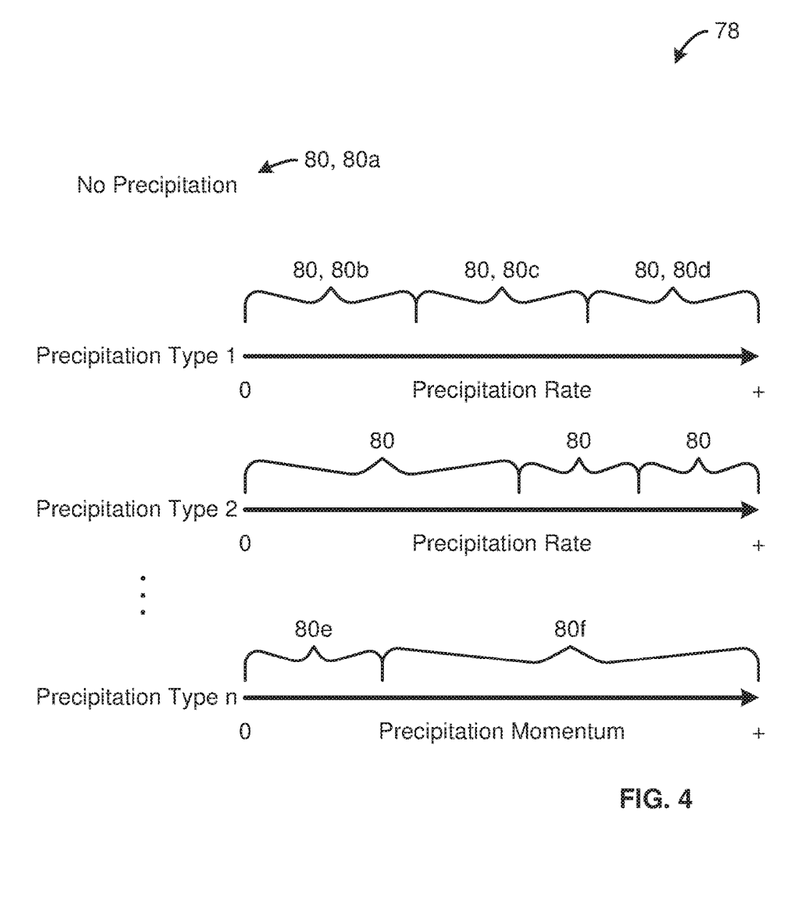
FIG. 4 is a schematic block diagram of a two-dimensional space divided into a plurality of classes, each class corresponding to a different precipitation condition.

Referring to FIG. 4, in selected embodiments, an artificial neural network in accordance with the present invention may be trained to recognize (e.g., produce affinity scores for) a certain, predetermined set 78 of classes 80 of meteorological precipitation. The number of classes 80 within such a set 78 may vary between embodiments. In certain embodiments, the number of classes 80 may be relatively few. For example, a set 78 of classes 80 may consist of as few as two classes 80 (e.g., a first class 80 corresponding to no precipitation or insufficient precipitation or precipitation effects to merit turning on the windshield wipers and a second class 80 corresponding to sufficient precipitation or precipitation effects to merit turning on the windshield wipers).

In other embodiments, the number of classes 80 in a set 78 may be significantly more. For example, a first class 80a of meteorological precipitation within a particular set 78 may correspond to no detectable precipitation or precipitation effects of any kind. Other classes 80 of meteorological precipitation within that set 78 may then correspond to various pairings of precipitation type and precipitation rate. These pairings may thus define specific precipitation conditions.

For example, a first precipitation type may be rain. Accordingly, a second class 80b within the set 78 may correspond to rain falling in the range of between about 0 inches per hour up to about 0.5 inches per hour. A third class 80c within the set 78 may correspond to rain falling in the range of between about 0.5 inches per hour up to about 2 inches per hour. A fourth class 80d within the set 78 may correspond to rain falling at about 2 inches per hour or greater. In this manner, various pairings of precipitation type and precipitation rate (e.g., ranges of precipitation rates) may define various classes 80 of meteorological precipitation. The dividing lines between the various precipitation rates may vary between different types of precipitation and different embodiments. Thus, the specific rate ranges provided above are presented by way of example and not by way of limitation.

The types of precipitation or precipitation effects for which classes 80 may be defined include rain, sleet, hail, snow, road spray, or the like or any combination or subcombination thereof. As noted above, these types of precipitation or precipitation effects may be paired with certain rate ranges to define specific precipitation conditions. However, in certain embodiments, rate of accumulation may be less important than other characteristics. Accordingly, in such embodiments, classes 80 may be defined based on those other characteristics, rather than by rate of accumulation.

For example, in selected embodiments, an "Nth" precipitation type may be hail. For hail, the momentum of the hail may be more important that the rate of accumulation. Accordingly, different classes 80e, 80f for hail may be defined in terms of momentum. Thus, hail impacting a vehicle 10 with less than a certain momentum (e.g., momentum insufficient to dent or otherwise damage the vehicle 10) may be considered one class 80e, while hail impacting the vehicle 10 with more than that certain momentum (e.g., momentum sufficient to dent or otherwise damage the vehicle 10) may be considered another class 80f. Such an organization of classes 80e, 80f may enable a system 12 to take actions, provide warnings (e.g., to the driver of the subject vehicle 10a or to drivers of nearby vehicles 10b), or the like that are capable of reducing the damage incurred or the harm experienced.

Figure 5:
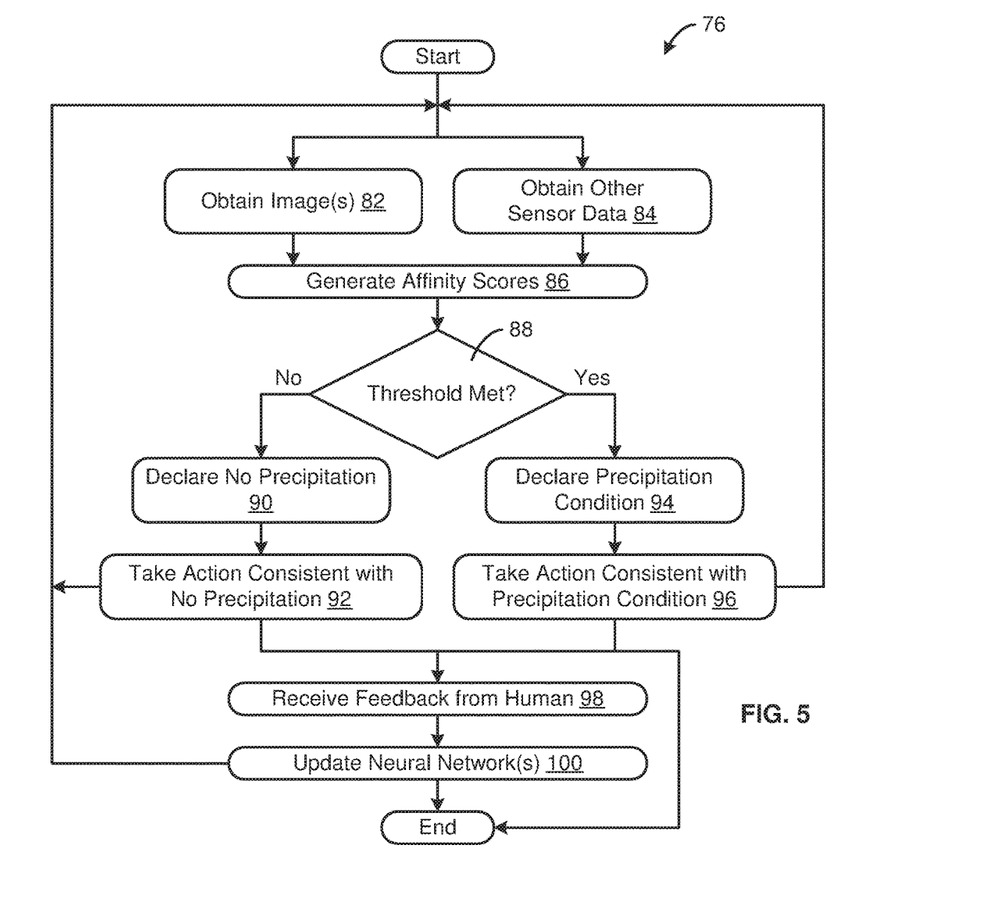
FIG. 5 is a schematic block diagram of one embodiment of a precipitation-detection method in accordance with the present invention.

Referring to FIG. 5, in selected embodiments, applying 76 the classification algorithms of an artificial neural network to image or other sensor data may begin with obtaining 82 one or more unclassified images and obtaining 84 other unclassified sensor data that pertain to (e.g., were all collected at or near) the same period of time. The one or more unclassified images and other unclassified sensor data so obtained may collected be considered "the input data." Accordingly, the input data may be fed to an artificial neural network that generates 86 affinity scores (e.g., percentages of confidence) for each class 80 of a corresponding set 78.

For example, if an artificial neural network were trained to differentiate between two classes 80 (e.g., a precipitation condition and a no precipitation condition), then the artificial neural network may generate 86 two affinity scores. Specifically, the artificial neural network may output a first percentage indicative of the confidence that the input data corresponds to a first class 80 and a second percentage indicative of the confidence that the input data corresponds to a second class 80.

Thereafter, a determination may be made 88 as to whether one or more applicable thresholds have been met. That is, depending on the magnitude of the various affinity scores (e.g., whether the percentage for one class 80 is above a particular threshold, the percentages for all other classes 80 are below a particular threshold, or both), the difference between the various affinity scores (e.g., whether the difference or separation between the percentage for one class 80 and the percentages for all other classes 80 is above a particular threshold), or the like or a combination thereof, the corresponding input data may be classified as one class or condition or the other.

For example, in a simplest case, a threshold may set at "50%." Accordingly, in a two class situation (e.g., precipitation or no precipitation), if one class 80 tallies higher than the other, the threshold may be met. Alternatively, a threshold may be set at something higher than 50% (e.g., somewhere in the range of about 55% to about 85%). In such embodiments or situations, an overall determination 88 as to whether a surrounding environment is indicative of one class 80 may not be settled by which class 80 or condition has the highest affinity score. Rather, like a higher burden of proof in a legal proceeding, the threshold may ensure that a classification does not just favor, but clearly or strongly favors one class 80 over all others. Accordingly, one or more thresholds may be set to lower the number of false positives with respect to one or more classes 80.

If a determination 88 indicates that a first class 80a or "no precipitation or precipitation effects" condition is not present, a neural network module 56 or artificial neural network thereof may declare 90 that a no precipitation or precipitation effects condition (e.g., a no rain condition) is present and a system 12 may take 92 one or more actions consistent with that condition.

Such action may include leaving a vehicle 10 how it is, deactivating certain wiper blades or lights, changing certain traction control settings, or otherwise returning a corresponding vehicle 10 back to a "normal" operating condition corresponding to no precipitation or precipitation effects. A system 12 may also enter a holding pattern and wait some period time (e.g., 10 seconds, 30 seconds, 1 minute, 5 minutes, 10 minutes, or the like) before obtaining 82, 84 new input data and starting the classification process again.

Conversely, if a determination 88 indicates that some other class 80 or precipitation condition within a particular set 78 (e.g., rain falling at between about 0.5 and about 2 inches per hour) is present, a neural network module 56 or an artificial neural network thereof may declare 94 that the particular precipitation condition is present and a system 12 may take 96 one or more actions consistent with that condition.

Such action may include leaving a vehicle 10a how it is, activating certain wiper blades or lights, changing the speed of certain wiper blades, changing certain traction control settings, issuing one or more warnings to a driver, communicating the particular precipitation condition to a communication system 22 or some other vehicle 10b, or otherwise preparing a corresponding vehicle 10 to adapt to an operating condition corresponding to the particular precipitation condition. A system 12 may also enter a holding pattern and wait some period time (e.g., 10 seconds, 30 seconds, 1 minute, 5 minutes, 10 minutes, or the like) before obtaining 82, 84 new input data and starting the classification process again. In certain embodiments, such action may include opening a specially designed umbrella or rain wear compartment when it is determined that a user opens a door of a vehicle 10 and intends to get out of the vehicle 10 when it is raining or the like.

A system 12 in accordance with the present invention may, while a corresponding vehicle 10 is running, continuously or periodically process data from one or more sensors 14, 16 to determine a current precipitation condition. Alternatively, a system 12 may process data from one or more sensors 14, 16 to determine a current precipitation condition only when certain pre-conditions are met. For example, a system 12 may process such data only when weather forecast information for the corresponding geographical location indicates the possibility for certain kinds of meteorological precipitation.

In selected embodiments, after one or more actions are taken 92, 96 by a system 12, a process 76 may end or cycle back and begin again. Alternatively, a process 76 may continue in order to utilize human feedback to improve a system 12. For example, in certain embodiments, a system 12 may at some point within a process 76 in accordance with the present invention receive 98 feedback from a human (e.g., a human driver). This feedback may indicate which class 80 or condition corresponds to which input data. Accordingly, the feedback and the corresponding input data may become training data used to update 100 and/or retrain an artificial neural network. Alternatively, or in addition thereto, such feedback may be used to adjust or fine tune one or more thresholds used in the process 76.

Figure 6:
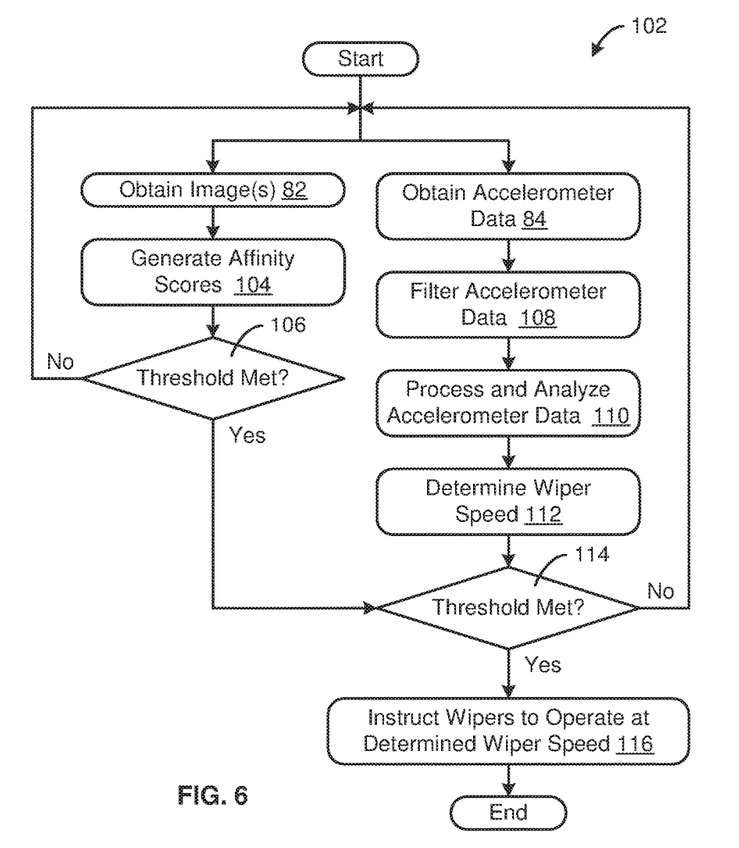
FIG. 6 is a schematic block diagram of a first alternative embodiment of a precipitation-detection method in accordance with the present invention.

Referring to FIG. 6, in selected processes in accordance with the present invention, image data may be processed using an artificial neural network, while other sensor data may be processing using other signal processing techniques. For example, in the illustrated process 102, one or more images (e.g., one or more images captured by a forward facing camera 14a, rearward facing camera 14b, in-cabin camera 14c) may be obtained 82 and processed by an artificial neural network, while accelerometer data (e.g., accelerometer data characterizing vibration of a windshield) may be obtained 84 and processed by filtering, using counters and phase-locked loops, or the like or combinations thereof.

In certain embodiments, once obtained 82, one or more images may be analyzed using sophisticated computer vision techniques involving recurrent neural networks to model and predict a level of driver visibility. For example, based on one or more images obtained 82 from an in-cabin camber 14c, a system 12 may predict if a driver would want to turn on the windshield wipers.

In selected embodiments, a system 12 may obtain 82 and use a sequence of images to predict rain. This may involve applying adaptable threshold techniques that operate successfully with just a couple of images. Accordingly, the images obtained 82 may be taken with different camera parameters (e.g., depth of field, exposure settings, etc.) and be fed to an artificial neural network, which may generate 104 an affinity score corresponding to each class of a plurality of classes. Sometime thereafter, one or more thresholds may be compared to the affinity scores to determine 106 an appropriate precipitation condition 80 (e.g., determine 106 whether it is appropriate to declare a particular precipitation condition 80).

In certain embodiments, one or more accelerometers may be mounted on the windshield of vehicle. Accordingly, the vibration created by rain drops, hail, or other precipitation or precipitation effects impacting the windshield may create distinctive signals on the accelerometer. The signal output by the one or more accelerometers may be filtered 108 (e.g., via a low pass filter) to locate and separate the variation caused by the precipitation or precipitation effects. Analysis 110 (e.g., using counters and phase-locked loops) of this signal may provide an estimate of the precipitation rate. Accordingly, a system 12 may make or determine 112 a precipitation prediction (e.g., an indication whether precipitation or a precipitation effect is present) and/or an optimal wiper speed. Sometime thereafter, one or more thresholds may be compared to one or more of these outputs to determine 114 an appropriate precipitation condition 80 (e.g., determine 106 whether it is appropriate to declare a particular precipitation condition 80).

In selected embodiments, if the determination 106 corresponding to the one or more images and the determination 114 corresponding to the accelerometer data both indicate a particular precipitation condition 80, a system 12 may take action 116 consistent with that condition 80. For example, a system 12 may instruct 116 one or more wipers to operate at one or more determined wiper speeds. Conversely, if one or both of the determinations 106, 114 fail to conclusively identify a particular precipitation condition 80, then no action (e.g., change) may be taken or implemented until other images and/or accelerometer data conclusively indicates a particular precipitation condition 80. This may assist in eliminating false positives that would be more annoying or distracting to a driver than a system 12 doing nothing (e.g., making no changes to the functions of the vehicle 10).

Figure 7:
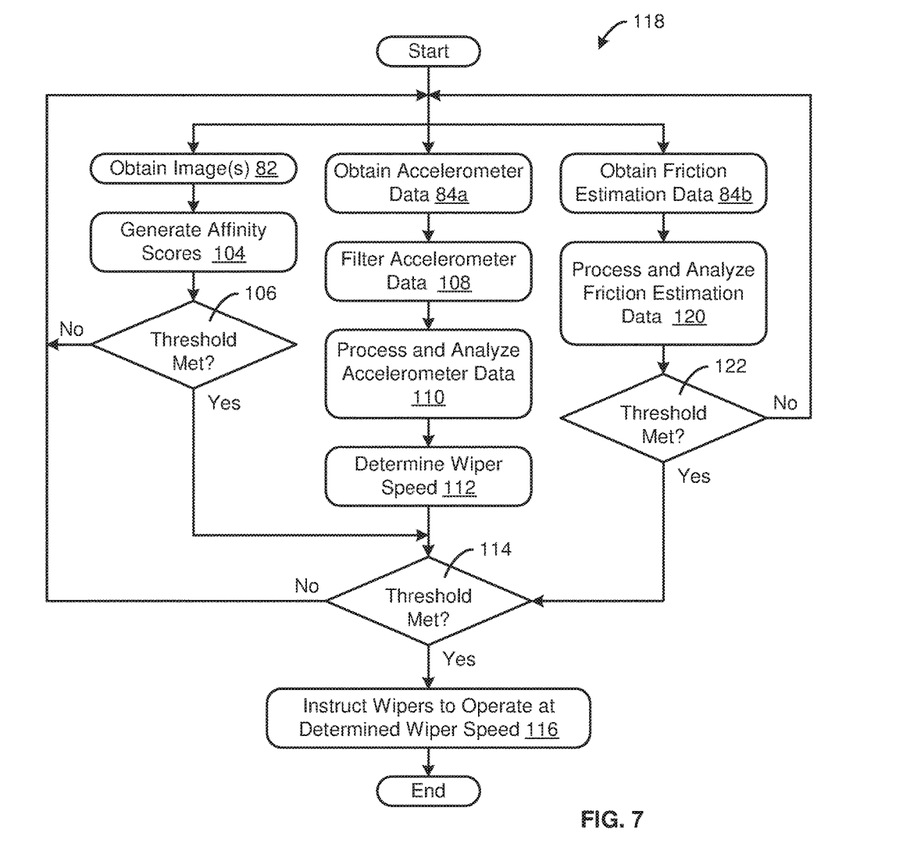
FIG. 7 is a schematic block diagram of a second alternative embodiment of a precipitation-detection method in accordance with the present invention.

Referring to FIG. 7, in selected processes in accordance with the present invention, image data may be processed using an artificial neural network, while multiple types of other sensor data may be processing using other signal processing techniques. For example, in the illustrated process 118, one or more images may be obtained 82 and processed by an artificial neural network, while accelerometer data may be obtained 84a and processed by filtering 108, using 110 counters and phase-locked loops, or the like or combinations thereof and friction data (e.g., data characterizing wheel slippage, the frictional grip or engagement between one or more tires of a vehicle 10 and a corresponding driving surface, or the like or a combination thereof) may be obtained 84b and processed 120 in some desired manner.

At some point, one or more thresholds may be compared to the friction data to determine 114 an appropriate precipitation condition 80 (e.g., determine 106 whether it is appropriate to declare a particular precipitation condition 80). Accordingly, if the determination 106 corresponding to the one or more images, the determination 114 corresponding to the accelerometer data, and the determination 122 corresponding to the friction data all indicate a particular precipitation condition 80, a system 12 may take action 116 consistent with that condition 80 (e.g., instruct 116 one or more wipers to operate at one or more determined wiper speeds). Conversely, if any of the determinations 106, 114, 122 fails to conclusively identify a particular precipitation condition 80, then no action (e.g., change) may be taken or implemented until other images, accelerometer data, and friction data conclusively indicate a particular precipitation condition 80. Again, this may assist in eliminating false positives.

In processes 62, 76, 102, 118 in accordance with the present invention, the weight given to image data or classifications of image data may not be equal to the weight given to other sensor data or determinations based on other sensor data. Similarly, the weight given to one type of other sensor data (e.g., accelerometer data) or determinations based on one type of other sensor data may not be equal to the weight given to another type of other sensor data (e.g., friction data) or determinations based on another type of other sensor data. Rather, different weights may be applied in order to preferentially consider data, classifications, determinations, or the like that have proven to be more useful in particular situations.

For example, image data (e.g., image data collected by a camera) may be more useful in detecting the presence of snow (e.g., falling snow or snow already on the ground) than accelerometer data. Accordingly, in selected embodiments or situations, when a thermometer reads a temperature that is compatible with snow, image data or the classifications based on image data may be weighted more heavily than accelerometer data or the determinations based on accelerometer data. In selected embodiments, such differential weightings may be "baked in" with the training of an artificial neural network (e.g., a single, general purpose artificial neural network). In other embodiments, such differential weightings may be manual programmed in based on experience or expectations.

The flowcharts in FIGS. 3 and 5-7 illustrate the architecture, functionality, and operation of possible implementations of systems, methods, and computer-program products according to various embodiments in accordance with the present invention. In this regard, each block in the flowcharts may represent a module, segment, or portion of code, which comprises one or more executable instructions for implementing the specified logical function(s). It will also be noted that each block of the flowchart illustrations, and combinations of blocks in the flowchart illustrations, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figures. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," "selected embodiments," "certain embodiments," etc., indicate that the embodiment or embodiments described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A vehicle comprising:
a camera outputting image data;
a windshield;
an accelerometer outputting accelerometer data characterizing vibration of the windshield;
an artificial neural network trained to classify meteorological precipitation in an environment of the vehicle using the image data and the accelerometer data as inputs; and
at least one actuator controlling at least one function of the vehicle based on classifications made by the artificial neural network;
wherein the artificial neural network includes a plurality of classifiers, each classifier of the plurality of classifiers being trained to detect a type of precipitation corresponding to the each classifier, each classifier being configured to take as inputs the accelerometer data and the image data and configured to output a decision indicating whether the type of precipitation corresponding to the each classifier is present; and
wherein each classifier is further configured to apply weights of the each classifier to the accelerometer data and the image data such that the weights of one classifier of the plurality of classifier are different from the weights of another classifier of the plurality of classifiers.

2. The vehicle of claim 1, wherein the camera is secured to the vehicle and oriented so as to be forward facing.

3. The vehicle of claim 1, wherein the camera is secured to the vehicle and oriented so as to be rearward facing.

4. The vehicle of claim 1, wherein the image data comprises multiple consecutive images captured by the camera over a period of less than ten seconds.

5. The vehicle of claim 4, further comprising at least one windshield wiper and wherein the at least one function comprises a speed of the at least one windshield wiper.

6. The vehicle of claim 5, further comprising a drivetrain having one or more tires.

7. The vehicle of claim 6, further comprising a drivetrain sensor outputting friction data characterizing frictional engagement of the one or more tires with a driving surface.

8. The vehicle of claim 7, wherein the artificial neural network is trained to classify meteorological precipitation based at least in part on each of the image data, the accelerometer data, and the friction data.

9. The vehicle of claim 4, further comprising a traction control system and wherein the at least one function comprises a setting of the traction control system.

10. The vehicle of claim 1, further comprising a communication system communicating one or more classifications of the artificial neural network to hardware off-board the vehicle.

11. The vehicle of claim 1, wherein the artificial neural network is trained to classify at least three classes of meteorological precipitation, the at least three classes comprising no rain, rain below a first precipitation rate, and rain above a second precipitation rate that is equal to or greater than the first precipitation rate.

12. A method comprising:
receiving, by a computer system carried on-board a vehicle, image data captured by a camera oriented so as to be forward or rearward facing with respect to the vehicle, wherein the image data comprises at least one image captured by the camera within a period of time;
receiving, by the computer system, accelerometer data output by an accelerometer secured to a windshield of the vehicle, wherein the accelerometer data characterizes vibration of the windshield during the period of time;
receiving, by an artificial neural network run on the computer system, the image data and the accelerometer data as inputs;
generating, by the artificial neural network, classification scores based on the inputs with respect to at least three classes of meteorological precipitation, the at least three classes comprising rain, hail, and snow; and
controlling, by the computer system, at least one function of the vehicle based on the classification scores generated by the artificial neural network;
wherein generating the classification scores based on the inputs comprises:
inputting the image data and accelerometer data to a plurality of classifiers, each classifier of the plurality of classifiers being trained to detect a class of the at least three classes of meteorological precipitation corresponding to the each classifier;
weighting, by each classifier of the plurality of classifiers, the image data and accelerometer data according to weights of the each classifier such that the weights of one classifier of the plurality of classifiers are different from the weights of another classifier of the plurality of classifiers;
generating, by each classifier of the plurality of classifiers, a classification score of the classifications scores according to the weights of the each classifier, the image data, and the accelerometer data.

13. The method of claim 12, wherein:
the image date comprises multiple consecutive images captured by the camera over the period of time; and
the period of time is less 10 seconds.

14. The method of claim 13, wherein the vehicle comprises at least one windshield wiper and wherein the at least one function comprises a speed of the at least one windshield wiper.

15. The method of claim 12, wherein the vehicle comprises a drivetrain having one or more tires.

16. The method of claim 15, wherein the vehicle further comprises a drivetrain sensor outputting friction data characterizing frictional engagement of the one or more tires with a driving surface.

17. The method of claim 16, further comprising receiving, by the artificial neural network, the image data, the accelerometer data, and the friction data as the inputs.

18. The method of claim 17, wherein the vehicle further comprises a traction control system and wherein the at least one function comprises a setting of the traction control system.

19. The method of claim 12, wherein the vehicle further comprises a communication system communicating one or more classifications made by the artificial neural network to hardware off-board the vehicle.

20. The method of claim 19, wherein the hardware off-board the vehicle forms part of stationary telecommunications infrastructure or another vehicle.

* * * * *